United States Patent
Itano et al.

(10) Patent No.: US 8,337,965 B2
(45) Date of Patent: Dec. 25, 2012

(54) SEALANT FOR ONE DROP FILL PROCESS CONTAINING PHOTO-CURABLE RESIN AND HEAT-CURABLE RESIN

(75) Inventors: Kazuyuki Itano, Tokyo (JP); Hiroya Fukunga, Tokyo (JP); Hirokatsu Shinano, Tokyo (JP); Rieko Hamada, Tokyo (JP); Takahiro Otsuka, Tokyo (JP)

(73) Assignee: Adeka Corporation, Tokyo (JP)

( * ) Notice: Subject to any disclaimer, the term of this patent is extended or adjusted under 35 U.S.C. 154(b) by 209 days.

(21) Appl. No.: 12/743,651

(22) PCT Filed: Jan. 5, 2010

(86) PCT No.: PCT/JP2010/050011
§ 371 (c)(1),
(2), (4) Date: May 19, 2010

(87) PCT Pub. No.: WO2010/084787
PCT Pub. Date: Jul. 29, 2010

(65) Prior Publication Data
US 2011/0054061 A1    Mar. 3, 2011

(30) Foreign Application Priority Data
Jan. 21, 2009  (JP) .................................. 2009-011351

(51) Int. Cl.
  *G02F 1/1339* (2006.01)
  *C08F 299/02* (2006.01)
  *C08G 591/50* (2006.01)
  *C09K 3/00* (2006.01)

(52) U.S. Cl. ........ 428/1.53; 430/20; 430/280.1; 522/64; 522/170; 522/100

(58) Field of Classification Search .................... 522/64, 522/100, 83, 170; 430/20, 280.1; 428/1.53
See application file for complete search history.

(56) References Cited

U.S. PATENT DOCUMENTS

| 3,842,023 | A  | * | 10/1974 | Anagnoston et al. ...... 528/111.3 |
| 6,280,890 | B1 | * | 8/2001  | Sawamura et al. ................ 430/7 |
| 6,913,798 | B2 | * | 7/2005  | Kitamura et al. ............. 428/1.53 |
| 7,244,495 | B2 | * | 7/2007  | Kozakai et al. ................ 428/354 |
| 7,521,100 | B2 | * | 4/2009  | Imaizumi et al. ............. 428/1.53 |
| 7,898,634 | B2 | * | 3/2011  | Huang et al. ................... 349/153 |
| 2006/0009579 | A1 | | 1/2006 | Miyawaki et al. |
| 2007/0096056 | A1 | * | 5/2007 | Takeuchi et al. ......... 252/299.01 |
| 2009/0114272 | A1 | | 5/2009 | Inoue et al. |

FOREIGN PATENT DOCUMENTS

| EP | 1 901 390   | 3/2008  |
| JP | 62-265323   | 11/1987 |
| JP | 5-297383    | 11/1993 |
| JP | 06-013600   | 2/1994  |
| JP | 2004-037937 | 2/2004  |
| JP | 2006-106385 | 4/2006  |
| JP | 2007-003911 | 1/2007  |
| JP | 2008-107738 | 5/2008  |

OTHER PUBLICATIONS

International Search Report, PCT/JP2010/050011, Feb. 2, 2010.
Extended European Search Report—EP 10 73 3394—Sep. 4, 2012.

* cited by examiner

*Primary Examiner* — Susan W Berman
(74) *Attorney, Agent, or Firm* — Young & Thompson

(57) ABSTRACT

A sealant for a one drop fill process of the invention contains the following components (1), (2), (3), and (4): (1) a curing agent composed of a reaction product produced by reacting an acid compound and a polyamine containing, within its molecule, at least one active hydrogen and at least two nitrogen atoms; (2) a heat-curable resin; (3) an acylphosphine-based photoinitiator; and (4) a photo-curable resin. A heat-curable resin containing a bisphenol A propylene oxide-modified epoxy resin is preferably used as the heat-curable resin (2), and a photo-curable resin containing a bisphenol A acrylate-modified resin is preferably used as the photo-curable resin (4).

20 Claims, No Drawings

SEALANT FOR ONE DROP FILL PROCESS CONTAINING PHOTO-CURABLE RESIN AND HEAT-CURABLE RESIN

TECHNICAL FIELD

The present invention relates to a sealant for a one drop fill process (ODF sealant) and a liquid crystal display (LCD) panel using the same. More specifically, the invention relates to an ODF sealant that causes less damage to liquid crystals by making the seal-curing conditions of the sealant mild and that exhibits excellent displaying properties without reducing the electric resistance of LCD elements that are manufactured, and also to an LCD panel using such an ODF sealant.

BACKGROUND ART

The one drop fill (ODF) technology is becoming the mainstream in processes for manufacturing LCD elements (LCD panels), replacing the conventional vacuum injection technology, in order to meet expectations of shortening the manufacturing process time. In an ODF process, LCD elements are produced as follows. First, a sealant is dispensed on an electrode-equipped substrate to form a frame of a display element, and liquid crystals are dropped inside the depicted frame. Next, another electrode-equipped substrate is joined thereto under vacuum. Then, the sealed portions are semi-cured by being irradiated with ultraviolet rays, and are then full-cured by being heated for liquid crystal annealing and heat-curing. This process, which employs two-stage curing consisting of photocuring and heat-curing, can shorten the curing time as well as the overall time for the LCD-element manufacturing process.

The currently-employed seal-curing conditions, however, involve irradiation of ultraviolet rays as well as curing at high temperatures, thus exposing the liquid crystals to both such ultraviolet rays and high temperatures upon seal-curing and greatly damaging them. Thus, the currently-employed conditions do not completely satisfy such needs as supporting the electrooptical properties required of the liquid crystals. Also, there are other problems to be solved, such as the energy cost incurred upon heat-curing and the need for further reduction in processing time. Accordingly, there has been a demand for a curing technique that utilizes visible light, which is not absorbed by the liquid crystals, and that employs a lower heat-curing temperature, with the aim of suppressing degradation of the liquid crystals during the process of curing the sealed portions.

Patent Document 1 discloses the advantages of combining a high-molecular-weight photoinitiator having at least three aromatic rings and a resin composition containing 60% by mol or more of a photocuring functional group. Patent Document 1, however, describes nothing about curing under visible light, nor does it particularly describe the advantages of an acylphosphine-based photoinitiator.

Meanwhile, conventionally-used latent curing agents for epoxy resins include hydrazide-based curing agents and amine adduct-based curing agents. A hydrazide-based curing agent consists of a single compound, and therefore, it is possible to reduce the effect it has on liquid crystal contamination by removing impurities through refining. However, such a hydrazide-based curing agent requires around 1 hour at 120° C. to cure. Accordingly, there is a demand for a curing agent that cures at lower temperatures and in a shorter time to thus simplify the curing process. As regards amine adduct-based curing agents, compounds containing tertiary amino groups are prone to form amine salts, thus having a tendency of inhibiting polymerization and making it difficult to obtain cured resins having good physical properties. On the other hand, compounds containing primary amino groups are prone to cause reaction with epoxy resins, thus having a drawback in storage stability. Patent Document 2 discloses a curing agent that allows curing to take place at curing temperatures of 80 to 100° C. by solving the above-mentioned problem by masking the primary amino groups with an acid substance. Patent Document 2, however, neither teaches nor suggests combining the disclosed curing agent with a photo-curable resin for use as an ODF sealant.

CITATION LIST

Patent Document
   Patent Document 1: JP-A-2007-3911
   Patent Document 2: JP-B-6-13600

SUMMARY OF THE INVENTION

Problems to be Solved by the Invention
   An object of the present invention is to provide a sealant for a one drop fill process (ODF sealant) that has low curing temperatures, high adhesive strength, and little effect in contaminating liquid crystals, and that is best suited for use as an ODF sealant that features two-stage curing consisting of heat-curing and photocuring which utilizes visible light in which light having wavelengths equal to or shorter than 400 nm has been cut off.

Means for Solving the Problems
   The present invention achieves the above object by using, as effective components of an ODF sealant, a photo-curable resin containing an acylphosphine-based radical initiator as a photoinitiator and a heat-curable resin containing a latent curing agent produced by reacting a polyamine and an acid compound.

That is, the present invention provides a sealant for a one drop fill process, containing the following components (1), (2), (3), and (4):
   (1) a curing agent composed of a reaction product produced by reacting an acid compound and a polyamine containing, within its molecule, at least one active hydrogen and at least two nitrogen atoms;
   (2) a heat-curable resin;
   (3) an acylphosphine-based photoinitiator; and
   (4) a photo-curable resin.

Further, the present invention provides a liquid crystal display panel using the above-mentioned sealant for a one drop fill process.

Effect of the Invention
   The sealant for a one drop fill process (ODF sealant) of the present invention is an ODF sealant that features two-stage curing consisting of heat-curing and photocuring which utilizes visible light in which light having wavelengths equal to or shorter than 400 nm has been cut off. The present ODF sealant contains a photo-curable resin containing an acylphosphine-based radical initiator as a photoinitiator that uses visible light and a heat-curable resin containing a latent curing agent produced by reacting a polyamine and an acid compound, and thus has high sealing strength and little effect in contaminating liquid crystals, and is best suited for use in LCD elements (LCD panels).

MODE FOR CARRYING OUT THE INVENTION

The present invention will be described in detail below with reference to preferred embodiments thereof.

First, the sealant for a one drop fill process (ODF sealant) of the present invention will be described.

The ODF sealant of the present invention contains the following components (1), (2), (3), and (4):

(1) a curing agent composed of a reaction product produced by reacting an acid compound and a polyamine containing, within its molecule, at least one active hydrogen and at least two nitrogen atoms;
(2) a heat-curable resin;
(3) an acylphosphine-based photoinitiator; and
(4) a photo-curable resin.

(1) Curing Agent

There is no particular limitation to the polyamine containing, within its molecule, at least one active hydrogen and at least two nitrogen atoms to be used in the present curing agent (1). Examples thereof include: ethylenediamine, propylenediamine, butylenediamine, hexamethylenediamine, diethylenetriamine, dipropylenetriamine, dibutylenetriamine, triethylenetetramine, tripropylenetetramine, tributylenetetramine, tetraethylenepentamine, tetrapropylenepentamine, tetrabutylenepentamine, N,N'-dimethylethylenediamine, pentaethylenehexamine, isophorone diamine, menthane diamine, phenylenediamine, 4-aminodiphenylamine, o-xylylenediamine, m-xylylenediamine, p-xylylenediamine, 3,5-diaminochlorobenzene, melamine, piperazine, 1-aminoethylpiperazine, monomethylaminopropylamine, methyliminobispropylamine, 1,3-bis(aminomethyl)cyclohexane, aminophenyl ether, polyethyleneimine, polypropyleneimine, poly-3-methylpropylimine, poly-2-ethylpropylimine, polyvinylamine, and polyallylamine; and copolymers of an unsaturated amine, such as vinylamine or allylamine, and another monomer having a copolymerizable unsaturated bond, such as dimethylacrylamide, styrene, methyl acrylate, methyl methacrylate, acrylic acid, methacrylic acid, or styrenesulfonic acid, or a salt thereof. Among the above polyamines, propylenediamine, isophorone diamine, menthane diamine, and 1,3-bis(aminomethyl)cyclohexane are preferably used.

In particular, a compound produced by adding an epoxy compound to the above-mentioned polyamine is preferably used as the present polyamine containing, within its molecule, at least one active hydrogen and at least two nitrogen atoms.

Examples of preferably-used epoxy compounds include alicyclic epoxy resins, aromatic epoxy resins, and aliphatic epoxy resins. A single type of the epoxy compound may be used, or two or more types may be used mixed.

Examples of the above-mentioned alicyclic epoxy resins include polyglycidyl ethers of polyols having at least one alicyclic ring, or cyclohexene oxide- or cyclopentene oxide-containing compounds obtained by epoxidizing a cyclohexene ring- or cyclopentene ring-containing compound with an oxidizing agent. Specific examples include hydrogenated bisphenol A diglycidyl ether, 3,4-epoxycyclohexylmethyl-3,4-epoxycyclohexane carboxylate, 3,4-epoxy-1-methylcyclohexyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy)cyclohexane-meta-dioxane, bis(3,4-epoxycyclohexylmethyl)adipate, 3,4-epoxy-6-methylcyclohexyl carboxylate, methylene-bis(3,4-epoxycyclohexane), dicyclopentadiene diepoxide, ethylene-bis(3,4-epoxycyclohexane carboxylate), dioctyl epoxyhexahydrophthalate, and di-2-ethylhexyl epoxyhexahydrophthalate.

Commercially-available products that can suitably be used as the above-mentioned alicyclic epoxy resins include: UVR-6100, UVR-6105, UVR-6110, UVR-6128, and UVR-6200 (products of Union Carbide Corporation); CELLOXIDE 2021, CELLOXIDE 2021P, CELLOXIDE 2081, CELLOXIDE 2083, CELLOXIDE 2085, CELLOXIDE 2000, CELLOXIDE 3000, CYCLMER A200, CYCLMER M100, CYCLMER M101, EPOLEAD GT-301, EPOLEAD GT-302, EPOLEAD 401, EPOLEAD 403, ETHB, and EPOLEAD HD300 (products of Daicel Chemical Industries, Ltd.); KRM-2110, and KRM-2199 (products of ADEKA Corporation).

Among the above-mentioned alicyclic epoxy resins, epoxy resins having a cyclohexene oxide structure are preferred in terms of curability (curing speed).

Examples of the above-mentioned aromatic epoxy resins include polyglycidyl ethers of polyphenols having at least one aromatic ring or alkylene oxide adducts thereof. Specific examples include: glycidyl ethers of bisphenol A, bisphenol F, or an alkylene oxide adduct thereof; and epoxy novolac resins.

Examples of the above-mentioned aliphatic epoxy resins include: polyglycidyl ethers of aliphatic polyols or alkylene oxide adducts thereof; polyglycidyl esters of aliphatic long-chain polybasic acids; homopolymers synthesized by vinyl polymerization of glycidyl acrylate or glycidyl methacrylate; and copolymers synthesized by vinyl polymerization of glycidyl acrylate or glycidyl methacrylate and other vinyl monomers. Specific examples include: glycidyl ethers of polyols, such as 1,4-butanediol diglycidyl ether, 1,6-hexanediol diglycidyl ether, a triglycidyl ether of glycerin, a triglycidyl ether of trimethylol propane, a tetraglycidyl ether of sorbitol, a hexaglycidyl ether of dipentaerythritol, a diglycidyl ether of polyethylene glycol, and a diglycidyl ether of polypropylene glycol; polyglycidyl ethers of polyether polyols obtained by adding one type, or two or more types, of an alkylene oxide to aliphatic polyols such as propylene glycol, trimethylol propane, and glycerin; and diglycidyl esters of aliphatic long-chain dibasic acids. Other examples include: monoglycidyl ethers of higher aliphatic alcohols; monoglycidyl ethers of phenol, cresol, or butylphenol, or a polyether alcohol obtained by adding an alkylene oxide to the above; glycidyl esters of higher fatty acids; epoxidized soybean oil; epoxystearic acid octyl ester; epoxystearic acid butyl ester; and epoxidized polybutadiene.

Commercially-available products that can suitably be used as the above-mentioned aromatic and aliphatic epoxy resins include: EPICOAT 801 and EPICOAT 828 (products of Yuka-Shell Epoxy Co., Ltd.); PY-306, 0163, and DY-022 (products of Ciba Specialty Chemicals Inc.); KRM-2720, EP-4100, EP-4000, EP-4901, EP-4010, EP-4080, EP-4900, ED-505, and ED-506 (products of ADEKA Corporation); EPOLIGHT M-1230, EPOLIGHT EHDG-L, EPOLIGHT 40E, EPOLIGHT 100E, EPOLIGHT 200E, EPOLIGHT 400E, EPOLIGHT 70P, EPOLIGHT 200P, EPOLIGHT 400P, EPOLIGHT 1500NP, EPOLIGHT 1600, EPOLIGHT 80MF, EPOLIGHT 100MF, EPOLIGHT 4000, EPOLIGHT 3002, and EPOLIGHT FR-1500 (products of Kyoeisha Chemical Co., Ltd.); SUNTOHTO ST0000, YD-716, YH-300, PG-202, PG-207, YD-172, and YDPN638 (products of Tohto Kasei Co., Ltd.); TEPIC-S (product of Nissan Chemical Industries, Ltd.); EPICLON N-665, EPICLON N-740, EPICLON HP-7200, and EPICLON HP-4032 (products of DIC Corporation).

Examples of the above-mentioned acid compound include phenolic resins, polyphenol compounds, and polycarboxylic acids. Phenolic resins are synthesized from phenols and aldehydes, and examples thereof include phenol/formalin resin, cresol/formalin resin, bisphenol A (BPA)/formalin resin, bisphenol F (BPF)/formalin resin, alkylphenol/formalin resin, and mixtures of the above. Particularly, phenol- or cresol novolac resin is preferred. Examples of the above-mentioned polyphenol compounds include bisphenol A, bisphenol F, and resorcinol. Examples of the above-mentioned polycarboxylic acids include dicarboxylic acids such as adipic acid, sebacic acid, dodecanedioic acid, and azelaic acid.

It is also possible to use, as the acid compound, a COOH-ended ester compound which is a COOH-ended adduct of an acid anhydride and a polyol, and it is possible to use, for example, a 2/1 mol adduct of phthalic anhydride/ethylene glycol or a 2/1 mol adduct of tetrahydrophthalic anhydride/propylene glycol.

In cases of using a phenolic resin or a polyphenol compound as the acid compound, the amount thereof to be mixed to 1 mol of the above-mentioned epoxy compound-amine adduct is preferably 0.20 to 3.0 mole equivalents, and more preferably 0.3 to 1.2 mole equivalents. A mixing amount smaller than 0.20 mole equivalents makes the storage stability extremely poor, whereas a mixing amount of more than 3.0 mole equivalents deteriorates compatibility, curability, and physical properties, and is thus not preferable.

In cases of using a polycarboxylic acid as the acid compound, the amount thereof to be mixed to 1 mol of the above-mentioned epoxy compound-amine adduct is preferably 0.01 to 2.0 mol, and more preferably 0.05 to 1.0 mol. A mixing amount of polycarboxylic acid exceeding 2.0 mol results in poor curability and significant deterioration in physical properties.

In cases of using a phenolic resin, a polyphenol compound, and a polycarboxylic acid in combination as the acid compound, the amount of phenolic resin and polyphenol compound to be mixed to 1 mol of the above-mentioned epoxy compound-amine adduct is preferably 0.3 to 1.2 mol, and the amount of polycarboxylic acid to be mixed to 1 mol of the above-mentioned epoxy compound-amine adduct is preferably 0.05 to 1.0 mol.

The present invention encompasses both methods of: mixing each of the phenolic resin, the polyphenol, and the polycarboxylic acid to the above-mentioned epoxy compound-amine adduct for reaction therewith; and mixing and combinedly-using a reaction product between the epoxy compound-amine adduct and the phenolic resin, a reaction product between the epoxy compound-amine adduct and the polyphenol, and a reaction product between the epoxy compound-amine adduct and the polycarboxylic acid.

The above-mentioned curing agent (1) is produced by reacting the above-mentioned acid compound and the above-mentioned polyamine containing, within its molecule, at least one active hydrogen and at least two nitrogen atoms—such as the above-mentioned epoxy compound-amine adduct—at the mixing amount described above. The reaction is carried out preferably at 80 to 200° C. for 30 minutes to 5 hours.

Among the above-mentioned curing agents (1), curing agents having a melting point of 100° C. or less are preferred because the processes can further be simplified.

In the present invention, the mixing amount of the curing agent (1) can be determined by matching the molar ratio between the reactive group(s) in the curing agent (1) and the reactive group(s) in the heat-curable resin (2). On the other hand, with reference to the epoxy resin, the amount of curing agent (1) to be mixed to 100 parts by weight of the epoxy resin is preferably 10 to 200 parts by weight, and more preferably 20 to 150 parts by weight. A mixing amount of curing agent (1) smaller than 10 parts by weight causes poor curing and contamination of liquid crystals by the epoxy resin, whereas a mixing amount of more than 200 parts by weight causes contamination of liquid crystals by the curing agent, leading to display unevenness.

In the present invention, the curing agent (1) may be used in combination with, for example, conventional latent curing agents, such as acid anhydrides, dicyandiamide, melamine, hydrazides, imidazoles, alkylureas, and guanamines. In such cases, the amount of conventional latent curing agent to be mixed to 100 parts by weight of the curing agent (1) is preferably 0.1 to 30 parts by weight.

(2) Heat-Curable Resin

Examples of the heat-curable resin (2) include the epoxy resins given as examples of the epoxy compounds described above. The epoxy resin to be used as the heat-curable resin may be the same type of epoxy resin used in the curing agent or may be different therefrom. A single type of epoxy resin may be used, or two or more types may be used mixed. Among such epoxy resins, the following may preferably be used as the heat-curable resin (2): bisphenol A-type epoxy resin, bisphenol F-type epoxy resin, hydrogenated bisphenol A-type epoxy resin, bisphenol A-propylene oxide-modified epoxy resin, phenol novolac-type epoxy resin, cresol novolac-type epoxy resin, naphthalene-type epoxy resin, or the like.

In particular, among the above-mentioned heat-curable resins (2), a heat-curable resin containing (preferably 5 to 30% by weight of) a bisphenol A propylene oxide-modified epoxy resin is preferred because of good compatibility and because only a small amount of the resin dissolves into the liquid crystals.

In the present invention, assuming that the total amount of the heat-curable resin (2) and the photo-curable resin (4) is 100 parts by weight, it is preferable that the weight ratio of the heat-curable resin (2) is 30 parts by weight or more, preferably 30 to 80 parts by weight, and more preferably 40 to 70 parts by weight, because adhesive strength can be improved. A weight ratio of heat-curable resin (2) smaller than 30 parts by weight increases the amount of shrinkage upon curing and thus deteriorates adhesive strength, whereas a weight ratio larger than 80 parts by weight increases the amount of epoxy resin dissolving into the liquid crystals, leading to display unevenness.

(3) Acylphosphine-Based Photoinitiator

Examples of the above-mentioned acylphosphine-based photoinitiator (3) include 2,4,6-trimethylbenzoyldiphenylphosphine oxide, 2,6-dimethylbenzoyldiphenylphosphine oxide, 2,6-dimethoxybenzoyldiphenylphosphine oxide, 2,6-dichlorobenzoyldiphenylphosphine oxide, 2,3,5,6-tetramethylbenzoyldiphenylphosphine oxide, bis(2,4,6-trimethylbenzoyl)phenylphosphine oxide, bis(2,6-dimethoxybenzoyl)-2,4,4-trimethyl-pentylphosphine oxide, 2,4,6-trimethylbenzoylphenylphosphinic acid methyl ester, 2,4,6-trimethylbenzoylphenylphosphinic acid ethyl ester, and 2,4,6-trimethylbenzoylphenylphosphinic acid phenyl ester.

Among the above-mentioned acylphosphine-based photoinitiators (3), an acylphosphine-based photoinitiator that generates radicals under light having wavelengths longer than 400 nm is preferred because curing through the use of visible light can reduce damage to liquid crystals and also because light-shielding portions can be cured favorably.

In the present invention, the amount of the acylphosphine-based photoinitiator (3) to be mixed to 100 parts by weight of the photo-curable resin (4) is preferably 0.01 to 3 parts by weight, and more preferably 0.1 to 1.5 parts by weight. A mixing amount of acylphosphine-based photoinitiator (3)

smaller than 0.01 parts by weight results in poor initiator efficiency and causes poor curing because of insufficient photocuring, whereas an amount of more than 3 parts by weight will make the initiator dissolve into the liquid crystals, leading to display unevenness.

(4) Photo-Curable Resin

The above-mentioned photo-curable resin (4) contains radical-polymerizable functional groups and cures through polymerization by being irradiated with light such as ultraviolet rays. A "radical-polymerizable functional group" refers to a functional group that is capable of causing polymerization by active energy rays such as ultraviolet rays, and examples thereof include (meth)acrylic groups and allyl groups. Examples of photo-curable resins containing such radical-polymerizable functional groups include (meth)acrylates and unsaturated polyester resins. These resins may be used singly or two or more types may be used together. Among these photo-curable resins, (meth)acrylates are preferred because reaction proceeds rapidly and because they have favorable adhesiveness. Note that the term "(meth) acrylic" as used herein means "acrylic" or "methacrylic".

The above-mentioned (meth)acrylates are not particularly limited, and examples thereof include urethane (meth)acrylates containing a urethane bond, and epoxy(meth)acrylates derived from (meth)acrylic acid and a compound containing a glycidyl group.

The above-mentioned urethane (meth)acrylate is not particularly limited, and examples thereof include derivatives of a diisocyanate, such as isophorone diisocyanate, and a reactive compound, such as acrylic acid or hydroxyethylacrylate, that undergoes addition reaction with isocyanate. These derivatives may undergo chain elongation through the use of caprolactones, polyols, etc. Examples of commercially-available products include: U-122P, U-340P, U-4HA, and U-1084A (products of Shin-Nakamura Chemical Co., Ltd.); KRM7595, KRM7610, and KRM7619 (products of Daicel-UCB Co., Ltd.).

The above-mentioned epoxy(meth)acrylate is not particularly limited, and examples thereof include epoxy(meth)acrylate derived from an epoxy resin, such as bisphenol A-type epoxy resin or propylene glycol diglycidyl ether, and (meth) acrylic acid. Examples of commercially-available products include: EA-1020, EA-6320, and EA-5520 (products of Shin-Nakamura Chemical Co., Ltd.); EPOXY ESTER 70PA and EPOXY ESTER 3002A (products of Kyoeisha Chemical Co., Ltd.). Examples of other (meth)acrylates include methyl methacrylate, tetrahydrofurfuryl methacrylate, benzyl methacrylate, isobornyl methacrylate, 2-hydroxyethyl methacrylate, glycidyl methacrylate, (poly)ethylene glycol dimethacrylate, 1,4-butanediol dimethacrylate, 1,6-hexanediol dimethacrylate, trimethylol propane triacrylate, pentaerythritol triacrylate, and glycerin dimethacrylate.

Further, a light/heat-curable resin may be used as the photo-curable resin (4). For example, it is possible to preferably use an epoxy/(meth)acrylic resin that contains at least one each of a (meth)acrylic group and an epoxy group within a single molecule.

Examples of the above-mentioned epoxy/(meth)acrylic resin include: a compound obtained by reacting a portion of the epoxy groups in the above-mentioned epoxy resin with (meth)acrylic acid in the presence of a basic catalyst according to usual methods; a compound obtained by reacting 1 mol of an isocyanate having two or more functionalities with ½ mol of a (meth)acrylic monomer having a hydroxyl group, followed by ½ mol of glycidol; and a compound obtained by reacting a (meth)acrylate having an isocyanate group with glycidol. An example of a commercially-available product of such an epoxy/(meth)acrylic resin includes UVAC1561 (product of Daicel-UCB Co., Ltd.).

Among the above-mentioned photo-curable resins (4), a photo-curable resin containing (preferably 20 to 70% by weight of) a bisphenol A acrylate-modified resin is preferred because only a small amount of the ODF sealant dissolves into the liquid crystals, thus reducing liquid crystal contamination.

An example of the above-described ODF sealant of the present invention containing the components (1), (2), (3), and (4) and having preferred compositional contents may be a sealant containing: preferably 5 to 40% by mass, and more preferably 10 to 30% by mass, of the curing agent (1); preferably 20 to 80% by mass, and more preferably 30 to 70% by mass, of the heat-curable resin (2); preferably 0.01 to 3% by mass, and more preferably 0.1 to 1.5% by mass, of the acylphosphine-based photoinitiator (3); and preferably 20 to 80% by mass, and more preferably 30 to 70% by mass, of the photo-curable resin (4).

A filler (5) may be added, as necessary, to the ODF sealant of the present invention. Examples of the filler (5) include fused silica, crystalline silica, silicon carbide, silicon nitride, boron nitride, calcium carbonate, magnesium carbonate, barium sulfate, calcium sulfate, mica, talc, clay, activated carbon, core-shell rubber, block-copolymerized high polymer, glass filler, alumina, titania, magnesium oxide, zirconium oxide, aluminum hydroxide, magnesium hydroxide, calcium silicate, aluminum silicate, lithium aluminum silicate, zirconium silicate, barium titanate, glass fiber, carbon fiber, and molybdenum disulfide. Preferable examples include fused silica, crystalline silica, silicon nitride, boron nitride, calcium carbonate, barium sulfate, calcium sulfate, mica, talc, clay, alumina, aluminum hydroxide, calcium silicate, and aluminum silicate, and further preferable examples include fused silica, crystalline silica, alumina, and talc. A single type of filler (5) may be used, or two or more types may be used mixed.

The amount of filler (5) to be mixed is generally around 10 to 40% by weight, and preferably around 15 to 35% by weight, with respect to the ODF sealant of the present invention.

Further, it is preferable to mix, to the ODF sealant of the present invention, a silane coupling agent (6) in order to obtain an ODF sealant improved in adhesive strength and being extremely reliable in moisture resistance. Examples of the silane coupling agent (6) include such silane coupling agents as 3-glycidoxypropyltrimethoxysilane, 3-glycidoxypropylmethyldimethoxysilane, 3-glycidoxypropylmethyldimethoxysilane, 2-(3,4-epoxycyclohexyl)ethyltrimethoxysilane, N-phenyl-γ-aminopropyltrimethoxysilane, N-(2-aminoethyl)-3-aminopropylmethyldimethoxysilane, N-(2-aminoethyl)-3-aminopropylmethyltrimethoxysilane, 3-aminopropyltriethoxysilane, 3-mercaptopropyltrimethoxysilane, vinyltrimethoxysilane, N-(2-(vinylbenzylamino) ethyl)-3-aminopropyltrimethoxysilane hydrochloride, 3-methacryloxypropyltrimethoxysilane, 3-chloropropylmethyldimethoxysilane, and 3-chloropropyltrimethoxysilane. A single type of silane coupling agent (6) may be used, or two or more types may be used mixed.

The amount of silane coupling agent (6) to be mixed is generally around 0.01% to 5% by weight, and preferably around 0.02% to 2% by weight, with respect to the ODF sealant of the present invention.

Other additives may further be added as necessary to the ODF sealant of the present invention. Examples of such additives include organic solvents, pigments, leveling agents, antifoaming agents, conductive materials, alumina, silica, silica powder, bituminous substances, cellulose, glass fiber, clay, mica, aluminum powder, Aerosil, talc, bentonite, calcium carbonate, and similar substances. Further, other agents, such as diluents and flame retardants, may be added as necessary to the ODF sealant of the present invention.

The amount of other additives to be mixed is preferably 10% by weight or less in total with respect to the ODF sealant of the present invention.

The ODF sealant of the present invention can be produced by blending predetermined amounts of a heat-curable resin component consisting of the curing agent (1) and the heat-curable resin (2) and a photo-curable resin component consisting of the acylphosphine-based photoinitiator (3) and the photo-curable resin (4) as well as various additives as necessary, dissolving and mixing the components together, and then homogenously mixing the mixture using a known mixing machine such as a triple roll mill, a sand mill, or a ball mill.

Next, the LCD panel of the present invention will be described.

The LCD panel of the present invention uses the ODF sealant of the present invention and is structured such that: a pair of substrates having predetermined electrodes is arranged in opposition to one another at a predetermined distance; the perimeter of the paired substrates is sealed using the ODF sealant of the present invention; and liquid crystals are enclosed in the gap formed inside. There is no particular limitation to the type of liquid crystals to be enclosed. Further, there is no particular limitation to the combination of substrates as long as the substrates are made of, for example, glass, quartz, plastic, or silicon, and at least one of them allows transmission of light therethrough.

Next, a preferred example of a method of manufacturing the LCD panel of the present invention will be described.

First, spacers (gap control materials), such as glass fibers, are added to the ODF sealant of the present invention. The sealant is then dispensed on one of the paired substrates using a dispenser, for example. Liquid crystals are then dropped on the inside of the uncured sealant that has been dispensed. The other glass substrate is placed on top and joined under vacuum, and then a gap having a predetermined width is formed.

After forming the gap, the sealed portions are irradiated with ultraviolet rays using an ultraviolet ray irradiator and thus photo-cured (semi-cured). Here, the UV irradiation dose is preferably 500 mJ/cm$^2$ to 6000 mJ/cm$^2$, and more preferably 1000 mJ/cm$^2$ to 4000 mJ/cm$^2$.

The semi-cured sealed portions are then heat-cured (full-cured) at 90 to 130° C. for 0.5 to 2 hours, to thus produce the LCD panel of the present invention. The so-obtained LCD panel of the present invention is free from display defects due to liquid crystal contamination, has excellent adhesiveness, and is extremely reliable in moisture resistance.

Examples of the above-mentioned spacers include glass fibers, silica beads, and polymer beads. The diameter thereof may be selected depending on the purpose, and is generally 2 to 8 μm, and preferably 4 to 7 μm. The amount of spacers used with respect to 100 parts by weight of the ODF sealant of the present invention is generally 0.1 to 4 parts by weight, preferably 0.5 to 2 parts by weight, and more preferably around 0.9 to 1.5 parts by weight.

EXAMPLES

The present invention will be described in further detail below through Examples and Comparative Examples. The present invention, however, is not limited whatsoever to these Examples etc.

Production Examples 1 and 2 below provide examples of producing the curing agent (1). Production Example 3 provides an example of producing the photo-curable resin (4) No. 1. Examples 1 to 5 and Comparative Examples 1 to 6 provide examples of producing the ODF sealant of the present invention and comparative sealants. Evaluation Examples 1-1 to 1-5 and Comparative Evaluation Examples 1-1 to 1-5 provide examples for evaluating adhesive strength. Evaluation Examples 2-1 and 2-2 and Comparative Evaluation Examples 2-1 and 2-2 provide examples for evaluating liquid crystal contamination.

Production Example 1

Production of Curing Agent No. 1

In a flask, to 140 g of 1,3-bis(aminomethyl)cyclohexane was added 250 g of "EP-4100" (bisphenol A-type epoxy resin; epoxy value: 185 g/eq) at 100° C. The mixture was then heated to 140° C. and subjected to an addition reaction for 2 hours, to obtain Polyamine No. 1. To 25 parts by weight of this Polyamine No. 1 was added 3 parts by weight of a phenol novolac resin "MP-800K" (product of Asahi Organic Chemicals Industry Co., Ltd.; softening point: 73° C.) having a melting point of 100° C., and the mixture was subjected to a melt masking reaction at 150° C. for 60 minutes, to obtain Curing Agent No. 1. The obtained curing agent was pulverized to a particle size of 5 μm or less using a jet mill. The melting point was 78° C.

Production Example 2

Production of Curing Agent No. 2

In a flask, 100 g of propylene diamine was warmed to 60° C., and while stirring, 340 g of "EP-4900" (bisphenol F-type epoxy resin; epoxy value: 170 g/eq) was added thereto in small quantities while keeping the temperature within 90 to 100° C. to cause reaction. After addition, the flask temperature was raised to 140° C., and an addition reaction was carried out for 1.5 hours, to obtain Polyamine No. 2. To 25 parts by weight of this Polyamine No. 2 was added 8 parts by weight of "MP-800K", and a melt masking reaction was carried out at 150° C. for 1 hour, to obtain Curing Agent No. 2. The obtained curing agent was pulverized to a particle size of 5 μm or less using a jet mill. The melting point was 80° C.

Production Example 3

Production of Photo-Curable Resin No. 1

In a 500 ml reaction flask were placed 90 g of bisphenol A-glycidyl ether-type epoxy resin "EP-4100" (product of ADEKA Corporation; epoxy value: 185 g/eq) and 133 g of toluene, and the mixture was stirred. To the mixture were added 1 g of triethylamine, 0.55 g of methoxyphenol, and 51.7 g of acrylic acid, and the mixture was heated to 95° C. and stirred at that temperature for 22 hours. The reaction was continued until the remaining amount found through epoxy value measurement became equal to or below 1%. The mixture was then cooled to 70° C., and 400 g of toluene was added thereto. The mixture was washed once with 250 g of water, washed three times with 250 g of NaOH aqueous solution (0.1 N), and washed with 250 g of pure water, until the electric conductivity of the aqueous layer became 1 μS/cm. The solvent was removed using an evaporator (at 60° C.), to obtain Photo-curable Resin No. 1—a bisphenol A epoxy acrylate-modified resin. The yield amount was 125.1 g, the yield rate was 94.1%, the viscosity (at 25° C.) was 911 Pa·s, and the acid value was 0 mg KOH/g.

Examples 1 to 5 and Comparative Examples 1 to 6

Production of Sealants Nos. 1 to 5 and Comparative Sealants Nos. 1 to 6

The following materials were mixed according to Table 1 below and were dispersed and kneaded using a triple roll mill, and the mixture was deaerated using a planetary mixer/deaerator, to obtain ODF Sealants according to the present invention and Comparative Sealants. Note that the contents of (1) and (2) were determined by matching the molar ratio between the reactive groups in the respective materials.

(1-1) Curing Agent No. 1 obtained in Production Example 1

(1-2) Curing Agent No. 2 obtained in Production Example 2

(1-3) "AMICURE VDH" (product of Ajinomoto Fine-Techno Co., Inc.): hydrazide-based curing agent (1-4) "AMICURE PN-23" (product of Ajinomoto Fine-Techno Co., Inc.): amine adducts-based curing agent (1-5) "ADH" (product of Otsuka Chemical Co., Ltd.): hydrazide-based curing agent (2-1) Heat-curable resin "EP-4100" (product of ADEKA Corporation): bisphenol A glycidyl ether-type epoxy resin (2-2) Heat-curable resin "EP-4000" (product of ADEKA Corporation): bisphenol A propylene oxide-modified glycidyl ether-type epoxy resin (3-1) Bis(2,4,6-trimethylbenzoyl)phenylphosphine oxide (3-2) 2,4,6-trimethylbenzoyldiphenylphosphine oxide (3-3) Benzyl dimethyl ketal (3-4) 2-benzyl-2-dimethylamino-1-(4-morpholinophenyl)-1-butanone (4) Photo-curable Resin No. 1 obtained in Production Example 3

(5) Silica gel "SE-2500" (product of Admatechs Co., Ltd.; particle size: 0.5 μm)

(6) Silane coupling agent "Z-6040N" (product of Dow Corning Toray Co., Ltd.)

TABLE 1

| | Sealant | | | | | Comparative Sealant | | | | | | (parts by weight) |
|---|---|---|---|---|---|---|---|---|---|---|---|---|
| | No. 1 | No. 2 | No. 3 | No. 4 | No. 5 | No. 1 | No. 2 | No. 3 | No. 4 | No. 5 | No. 6 | |
| (1-1) | 20 | — | 17 | 20.5 | 20 | — | — | — | 12.5 | 20 | 20 | |
| (1-2) | — | 20 | — | — | — | — | — | — | — | — | — | |
| (1-3) | — | — | — | — | — | 13.8 | — | — | — | — | — | |
| (1-4) | — | — | — | — | — | — | 10 | — | — | — | — | |
| (1-5) | — | — | — | — | — | — | — | 9.2 | — | — | — | |
| (2-1) | 28 | 28 | 28 | 35 | 28 | 28 | 28 | 28 | 20 | 28 | 28 | |
| (2-2) | 7 | 7 | — | — | 7 | 7 | 7 | 7 | — | 7 | 7 | |
| (3-1) | 1.0 | 1.0 | 1.0 | 1.0 | — | 1.0 | 1.0 | 1.0 | 1.0 | — | — | |
| (3-2) | — | — | — | — | 1.0 | — | — | — | — | — | — | |
| (3-3) | — | — | — | — | — | — | — | — | — | 1.0 | — | |
| (3-4) | — | — | — | — | — | — | — | — | — | — | 1.0 | |
| (4) | 17.5 | 17.5 | 28 | 17 | 17.5 | 17.5 | 17.5 | 17.5 | 40 | 17.5 | 17.5 | |
| (5) | 25.5 | 25.5 | 26.0 | 25.5 | 25.5 | 25.5 | 25.5 | 25.5 | 25.5 | 25.5 | 25.5 | |
| (6) | 2.0 | 2.0 | 2.0 | 2.0 | 2.0 | 2.0 | 2.0 | 2.0 | 2.0 | 2.0 | 2.0 | |

Evaluation Examples 1-1 to 1-5 and Comparative Evaluation Examples 1-1 to 1-5

Measurement of Adhesive Strength

The Sealants Nos. 1 to 4 obtained in Examples 1 to 4 above and the Comparative Sealants Nos. 1 to 4 obtained in Comparative Examples 1 to 4 above were each dispensed using a dispenser on a non-alkali glass plate 50 mm long, 25 mm wide, and 4.0 mm thick in such a manner that the dispensed sealant, after attachment, took the form of circles 2.0 to 3.0 mm in diameter, and then, another glass plate of the same type was attached thereto in such a manner that the two glass plates formed a cross. Using a high-pressure mercury-vapor lamp (750 W) and a filter that cuts off light having wavelengths of 400 nm or shorter, each specimen was irradiated with 3000 mJ/cm$^2$ of 405-nm light, and then cured according to the curing condition (shown in Table 2) depending on the type of curing agent contained in each sealant. The adhesive strength of each of the so-obtained test specimens was measured using a universal tester "HG-200" (product of Shimadzu Scientific Instruments). The results are shown in Table 2.

TABLE 2

| | Sealant | Curing Agent | Curing Condition | Adhesive Strength/ (N/mm²) |
|---|---|---|---|---|
| Evaluation Example 1-1 | Sealant No. 1 | Curing Agent No. 1 | 120° C./1 h | 22.9 |
| Evaluation Example 1-2 | Sealant No. 1 | Curing Agent No. 1 | 100° C./0.5 h | 22.4 |
| Evaluation Example 1-3 | Sealant No. 2 | Curing Agent No. 2 | 100° C./0.5 h | 14.3 |
| Evaluation Example 1-4 | Sealant No. 3 | Curing Agent No. 1 | 100° C./0.5 h | 10.3 |
| Evaluation Example 1-5 | Sealant No. 4 | Curing Agent No. 1 | 100° C./0.5 h | 12.1 |
| Comparative Evaluation Example 1-1 | Comparative Sealant No. 1 | AMICURE VDH | 120° C./1 h | 16.1 |
| Comparative Evaluation Example 1-2 | Comparative Sealant No. 1 | AMICURE VDH | 100° C./0.5 h | 3.4 |
| Comparative Evaluation Example 1-3 | Comparative Sealant No. 2 | AMICURE PN-23 | 80° C./0.5 h | 1.7 |
| Comparative Evaluation Example 1-4 | Comparative Sealant No. 3 | ADH | 140° C./10 min | 2.3 |
| Comparative Evaluation Example 1-5 | Comparative Sealant No. 4 | Curing Agent No. 1 | 100° C./0.5 h | 5.7 |

Table 2 shows that, in Evaluation Examples 1-1 and 1-2, the Sealants according to the present invention exhibit high adhesive strength even under relatively mild conditions, whereas Comparative Evaluation Example 1-1 exhibits lower adhesive strength and Comparative Evaluation Example 1-2 exhibits extremely poor adhesive strength. Further, Comparative Sealants Nos. 2 to 4 all have extremely poor adhesive strength as compared to the Sealants of the present invention. This reveals that the Sealants according to the present invention can provide high adhesive strength even under mild conditions, as compared to the Comparative Sealants.

Evaluation Examples 2-1 and 2-2 and Comparative Evaluation Examples 2-1 and 2-2

Evaluation of Liquid Crystal Contamination

Evaluation of liquid crystal contamination was made on the Sealants Nos. 1 and 5 obtained respectively in Examples 1 and 5 above and Comparative Sealants Nos. 5 and 6 obtained respectively in Comparative Examples 5 and 6 above according to the following procedure.

Each of the Sealants according to the present invention and the Comparative Sealants was dispensed on a 30-mm-dia. petri dish in the form of a 6-by-6-mm square, and 0.5 g of a liquid crystal composition was added thereto. Using a high-pressure mercury-vapor lamp (750 W) and a filter that cuts off light having wavelengths of 400 nm or shorter, each specimen was irradiated with 3000 mJ/cm2 of 405-nm light, and then cured under a curing condition of 100° C. for 0.5 hours. Each liquid before curing was sampled in advance with a pipette, and also, each liquid after curing was sampled likewise from the petri dish with a pipette. Each sampled liquid was introduced to a TN cell for liquid crystal evaluation (cell thickness: 5 µm; electrode area: 8 mm by 8 mm; alignment film: "JALS 2096"), and the voltage holding ratio (VHR) thereof was measured using a "VHR-1A" measurement system (product of Toyo Corporation). (The measurement conditions were as follows: pulse voltage width: 60 µs; frame cycle: 16.7 ms; pulse height: ±5 V; measurement temperature: 25° C.) The VHRs before and after curing were compared, to find the rate of decrease in VHR. The results are shown in Table 3.

Note that the above-mentioned liquid crystal composition was prepared by mixing the following liquid crystal compounds Nos. 1 to 10 shown in [formula 1] below according to the proportions shown in [formula 1].

[formula 1]

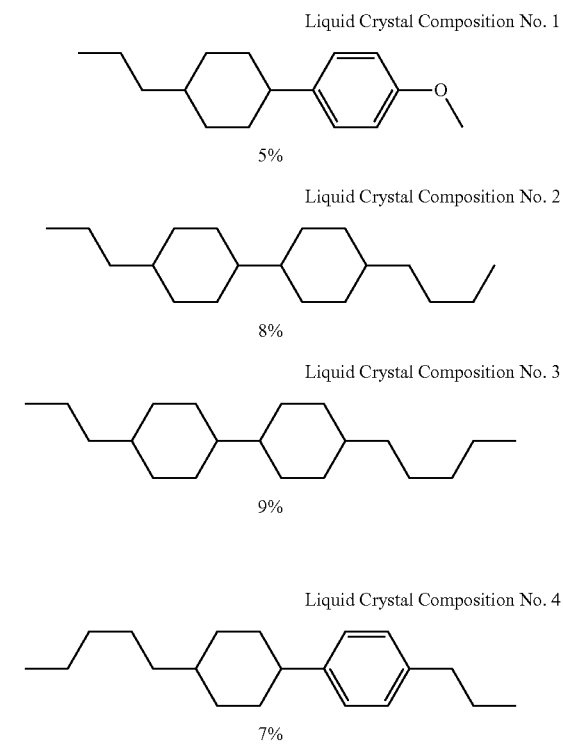

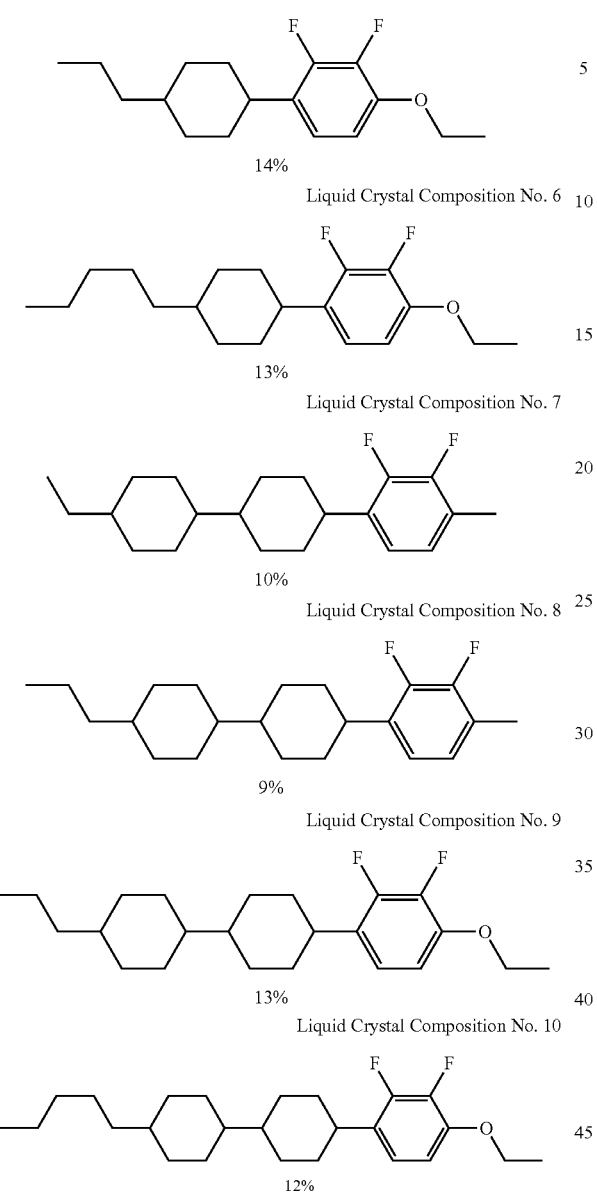

TABLE 3

| Sealant | VHR Decrease Rate/ (%) |
|---|---|
| Evaluation Example 2-1 | Sealant No. 1 | 93.5 |
| Evaluation Example 2-2 | Sealant No. 5 | 93.5 |
| Comparative Evaluation Example 2-1 | Comparative Sealant No. 5 | 92.8 |
| Comparative Evaluation Example 2-2 | Comparative Sealant No. 6 | 91.4 |

Table 3 shows that both the Comparative Sealants exhibit a larger decrease in VHR and greatly contaminate the liquid crystals, as compared to the Sealants according to the present invention which use acylphosphine-based photoinitiators. This reveals that the Sealants according to the present invention have little effect in contaminating liquid crystals and are thus useful as ODF sealants.

The above evaluations reveal that the ODF sealants according to the present invention cure at low temperatures, have high adhesive strength, and are reduced in their effect in contaminating liquid crystals.

The invention claimed is:

1. A sealant for a one drop fill process, comprising the following components (1), (2), (3), and (4):
   (1) a curing agent composed of a reaction product produced by reacting an acid compound and a polyamine, the polyamine containing at least one active hydrogen and at least two nitrogen atoms;
   (2) a heat-curable resin;
   (3) an acylphosphine photoinitiator; and
   (4) a photo-curable resin.

2. The sealant according to claim 1, wherein, a weight ratio of the heat-curable resin (2) is 30 parts by weight or more, based on a total amount of the heat-curable resin (2) and the photo-curable resin (4) of 100 parts by weight.

3. The sealant according to claim 2, wherein the curing agent (1) has a melting point that is 100° C. or less.

4. The sealant according to claim 2, wherein the photo-curable resin (4) is a photo-curable resin containing an acrylated-bisphenol A resin.

5. The sealant according to claim 2, wherein the acylphosphine photoinitiator (3) generates a radical under light having wavelengths longer than 400 nm.

6. The sealant according to claim 2, wherein the heat-curable resin (2) is a heat-curable resin containing an epoxy-functional bisphenol A resin containing propylene oxide units.

7. The sealant according to claim 1, wherein the curing agent (1) has a melting point that is 100° C. or less.

8. The sealant according to claim 7, wherein the photo-curable resin (4) is a photo-curable resin containing an acrylated-bisphenol A resin.

9. The sealant according to claim 7, wherein the acylphosphine photoinitiator (3) generates a radical under light having wavelengths longer than 400 nm.

10. The sealant according to claim 7, wherein the heat-curable resin (2) is a heat-curable resin containing an epoxy-functional bisphenol A resin containing propylene oxide units.

11. The sealant according to claim 1, wherein the photo-curable resin (4) is a photo-curable resin containing an acrylated-bisphenol A resin.

12. The sealant according to claim 11, wherein the heat-curable resin (2) is a heat-curable resin containing an epoxy-functional bisphenol A resin containing propylene oxide units.

13. The sealant according to claim 1, wherein the acylphosphine photoinitiator (3) generates a radical under light having wavelengths longer than 400 nm.

14. The sealant according to claim 1, wherein the heat-curable resin (2) is a heat-curable resin containing an epoxy-functional bisphenol A resin containing propylene oxide units.

15. The sealant according to claim 1, wherein the polyamine is selected from the group consisting of: propylene diamine, isophorone diamine, menthane diamine, and 1,3-bis(aminomethyl)cyclohexane.

16. The sealant according to claim 1, wherein the polyamine is an adduct of a polyamine and an epoxy compound selected from the group consisting of alicyclic epoxy resins, aromatic epoxy resins, aliphatic epoxy resins and combinations thereof.

17. The sealant according to claim 1, wherein the acid compound is selected from the group consisting of: phenolic resins, polyphenol compounds, polycarboxylic acids, COOH-ended ester compounds and combinations thereof.

18. The sealant according to claim 1, wherein the acid compound is a phenol resin and the polyamine is an adduct of 1,3-bis(aminomethyl)cyclohexane and a bisphenol A epoxy resin.

19. The sealant according to claim 1, wherein the acid compound is a phenol resin and the polyamine is an adduct of propylene diamine and bisphenol F epoxy resin.

20. A liquid crystal display panel comprising the sealant according to claim 1.

* * * * *